(12) United States Patent
Lee (10) Patent No.: US 12,160,012 B2
(45) Date of Patent: Dec. 3, 2024

(54) BATTERY PACK AND VEHICLE INCLUDING SAME

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 317 days.

(21) Appl. No.: 17/772,945

(22) PCT Filed: Jul. 7, 2021

(86) PCT No.: PCT/KR2021/008684
§ 371 (c)(1),
(2) Date: Apr. 28, 2022

(87) PCT Pub. No.: WO2022/010274
PCT Pub. Date: Jan. 13, 2022

(65) Prior Publication Data
US 2023/0335852 A1    Oct. 19, 2023

(30) Foreign Application Priority Data

Jul. 8, 2020    (KR) .......................... 10-2020-0084320

(51) Int. Cl.
*B60L 50/64*    (2019.01)
*B60L 58/26*    (2019.01)
(Continued)

(52) U.S. Cl.
CPC ........... *H01M 50/249* (2021.01); *B60L 50/64* (2019.02); *B60L 58/26* (2019.02); *H01M 10/613* (2015.04);
(Continued)

(58) Field of Classification Search
CPC .. H01M 50/24; H01M 10/625; H01M 10/659; H01M 10/6551; H01M 10/617;
(Continued)

(56) References Cited

U.S. PATENT DOCUMENTS

| 8,212,524 B2* | 7/2012 | Ha ....................... H02J 7/0029 320/121 |
| 8,994,333 B2* | 3/2015 | Kim ..................... H02J 7/0031 320/135 |

(Continued)

FOREIGN PATENT DOCUMENTS

| EP | 0 795 206 B1 | 4/1999 |
| JP | 2005-285624 A | 10/2005 |

(Continued)

OTHER PUBLICATIONS

Extended European Search Report for European Application No. 21838029.3, dated Jan. 8, 2024.
(Continued)

*Primary Examiner* — James A Shriver, II
*Assistant Examiner* — Hilary L Johns
(74) *Attorney, Agent, or Firm* — Birch, Stewart, Kolasch & Birch, LLP (57) ABSTRACT

A battery pack includes: a plurality of battery modules; a pack housing in which the plurality of battery modules are accommodated; and an energy consumption unit accommodated inside the pack housing, connected to at least one of the plurality of battery modules, and configured to convert electrical energy stored in the battery module into thermal energy as a temperature inside the pack housing increases and dissipate the thermal energy through at least one of the pack housing and a heat sink.

13 Claims, 6 Drawing Sheets

(51) Int. Cl.
  *H01M 10/613* (2014.01)
  *H01M 50/209* (2021.01)
  *H01M 50/249* (2021.01)
(52) U.S. Cl.
  CPC ...... *H01M 50/209* (2021.01); *H01M 2220/20* (2013.01)
(58) Field of Classification Search
  CPC ............. H01M 10/658; H01M 10/657; H01M 50/249; H01M 10/613; H01M 50/209; H01M 2220/20; B60L 50/64; B60L 58/26
  USPC ....................................................... 180/68.5
  See application file for complete search history.

(56) References Cited

U.S. PATENT DOCUMENTS

| | | | |
|---|---|---|---|
| 11,316,230 B1* | 4/2022 | Boecker | ............ H01M 10/6556 |
| 2007/0054157 A1 | 3/2007 | Ryu et al. | |
| 2010/0127662 A1* | 5/2010 | Ha | ........................ H02J 7/0029 |
| | | | 320/128 |
| 2012/0056598 A1 | 3/2012 | Kim et al. | |
| 2015/0303528 A1 | 10/2015 | Wu | |
| 2018/0198294 A1 | 7/2018 | Sheeks et al. | |
| 2019/0299799 A1 | 10/2019 | Hinterberger et al. | |
| 2019/0305281 A1 | 10/2019 | Hale | |

FOREIGN PATENT DOCUMENTS

| | | | |
|---|---|---|---|
| JP | 2015-89170 A | | 5/2015 |
| JP | 2015-207552 A | | 11/2015 |
| JP | 2017111900 A | * | 6/2017 |
| KR | 20-0185269 Y1 | | 6/2000 |
| KR | 10-2007-0028228 A | | 3/2007 |
| KR | 10-2008-0023377 A | | 3/2008 |
| KR | 10-2012-0023896 A | | 3/2012 |
| KR | 10-2015-0133435 A | | 11/2015 |
| KR | 10-2016-0019086 A | | 2/2016 |
| KR | 10-2019-0071455 A | | 6/2019 |
| KR | 10-2019-0077550 A | | 7/2019 |
| KR | 10-2066916 B1 | | 1/2020 |
| KR | 10-2020-0069469 A | | 6/2020 |

OTHER PUBLICATIONS

International Search Report for PCT/KR2021/008684 (PCT/ISA/210) mailed on Oct. 25, 2021.

* cited by examiner

BATTERY PACK AND VEHICLE INCLUDING SAME

TECHNICAL FIELD

The present disclosure relates to a battery pack and a vehicle including the same, and more particularly, a battery pack having improved stability against thermal runaway of a plurality of battery modules.

The present application claims priority to Korean Patent Application No. 10-2020-0084320 filed on Jul. 8, 2020 in the Republic of Korea, the disclosures of which are incorporated herein by reference.

BACKGROUND ART

Currently commercialized secondary batteries include nickel cadmium batteries, nickel hydride batteries, nickel zinc batteries, and lithium batteries. Among them, lithium secondary batteries are in the spotlight because they have almost no memory effect compared to nickel-based secondary batteries, and thus have advantages of free charge/discharge, very low self-discharge rate, and high energy density.

A lithium secondary battery mainly uses a lithium-based oxide and a carbon material as a positive electrode active material and a negative electrode active material, respectively. The lithium secondary battery includes an electrode assembly in which a positive electrode plate and a negative electrode plate to which the positive electrode active material and the negative electrode active material are respectively applied are located with a separator therebetween, and a casing, that is, a battery pouch casing, for sealing and accommodating the electrode assembly along with an electrolytic solution.

Recently, secondary batteries have been widely used not only in small devices such as portable electronic devices but also in medium and large devices such as vehicles or power storage devices. When used in a medium or large device, a large number of secondary batteries are electrically connected to increase capacity and output. In particular, pouch-type secondary batteries are widely used in medium and large devices because they are easily stacked.

As the need for large capacity structures that may be used as energy storage sources has recently increased, the demand for a battery pack including a plurality of battery cells that are electrically connected in series and/or in parallel, a plurality of battery modules each accommodating a plurality of battery cells therein, and a battery management system (BMS) has increased.

However, battery packs of the prior art have problems in that thermal runaway may occur in some of a plurality of battery modules, the temperature of the battery modules may be increased, heat or flame may be transferred to other adjacent battery modules, and secondary thermal runaway or ignition may occur, thereby leading to bigger accidents.

DISCLOSURE

Technical Problem

The present disclosure is designed to solve the problems of the related art, and therefore the present disclosure is directed to providing a battery pack having improved stability against thermal runaway of a plurality of battery modules.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In an aspect of the present disclosure, there is provided a battery pack including: a plurality of battery modules; a pack housing in which the plurality of battery modules are accommodated; and an energy consumer accommodated inside the pack housing, connected to at least one battery module of the plurality of battery modules, and configured to convert electrical energy stored in the at least one battery module into thermal energy as a temperature inside the pack housing increases and dissipate the thermal energy through at least one of the pack housing and a heat sink.

The energy consumer may include: a resistor electrically connected to the at least one battery module as the temperature inside the pack housing increases; a heat insulating member surrounding at least a part of the resistor; and a heat dissipater configured to connect the heat insulating member to the pack housing.

The heat dissipater may include: an upper plate extending in a horizontal direction, and including a portion an upper surface contacting an inner ceiling of the pack housing or the heat sink; a pillar extending in a vertical direction, and including an upper end coupled to a lower surface of the upper plate and a receiving space in which the resistor unit and the heat insulating member are accommodated; and a lower extending in the horizontal direction, and including an upper surface coupled to a lower end of the pillar and a lower surface contacting a bottom surface of the pack housing or the heat sink.

The heat dissipater may further include: a first extending plate configured to connect an upper end of an outer surface of the pillar to the lower surface of the upper plate; and a second extending plate configured to connect a lower end of the outer surface of the pillar to the upper surface of the lower plate.

Any one of the upper plate and the lower plate may contact the heat sink, and the plate contacting the heat sink may have a larger area than the other plate.

The heat insulating member may further surround the pillar-portion.

The battery pack may further include at least one heat insulating wall located between the heat dissipater and the a second battery module of the plurality of battery modules.

The heat insulating member may include a phase change material and a receiving portion in which the phase change material is accommodated, wherein the phase change material is configured to, when the resistor converts electrical energy of the at least one battery module into thermal energy, be vaporized by receiving the thermal energy from the resistor-unit, and wherein an outlet configured to discharge the vaporized phase change material to outside is provided in the receiving portion.

The pack housing includes a receiving groove in which at least a part of the resistor is accommodated, and wherein the heat insulating member surrounds the at least part of the resistor accommodated in the receiving groove.

The heat dissipater may have a plate shape extending in a horizontal direction on the heat insulating member, and include end portions extending to a side wall of the pack housing to be connected to an inner surface of the pack housing.

In another aspect of the present disclosure, there is also provided a vehicle including the battery pack.

Advantageous Effects

According to an aspect of the present disclosure, because an energy consumption unit includes a resistor unit configured to convert electrical energy into thermal energy when thermal runaway occurs in at least one of a plurality of battery modules, a heat insulating member located to surround at least a part of the resistor unit, and a heat dissipating unit configured to connect the heat insulating member to a pack housing to conduct the thermal energy received from the resistor unit to the pack housing, propagation of the thermal runaway between the plurality of battery modules may be effectively prevented. That is, electrical energy (power) of the battery module in which thermal runaway occurs is consumed as thermal energy, and thus the battery module is prevented from causing thermal runaway any more, thereby preventing the thermal runaway from propagating to other adjacent battery modules.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
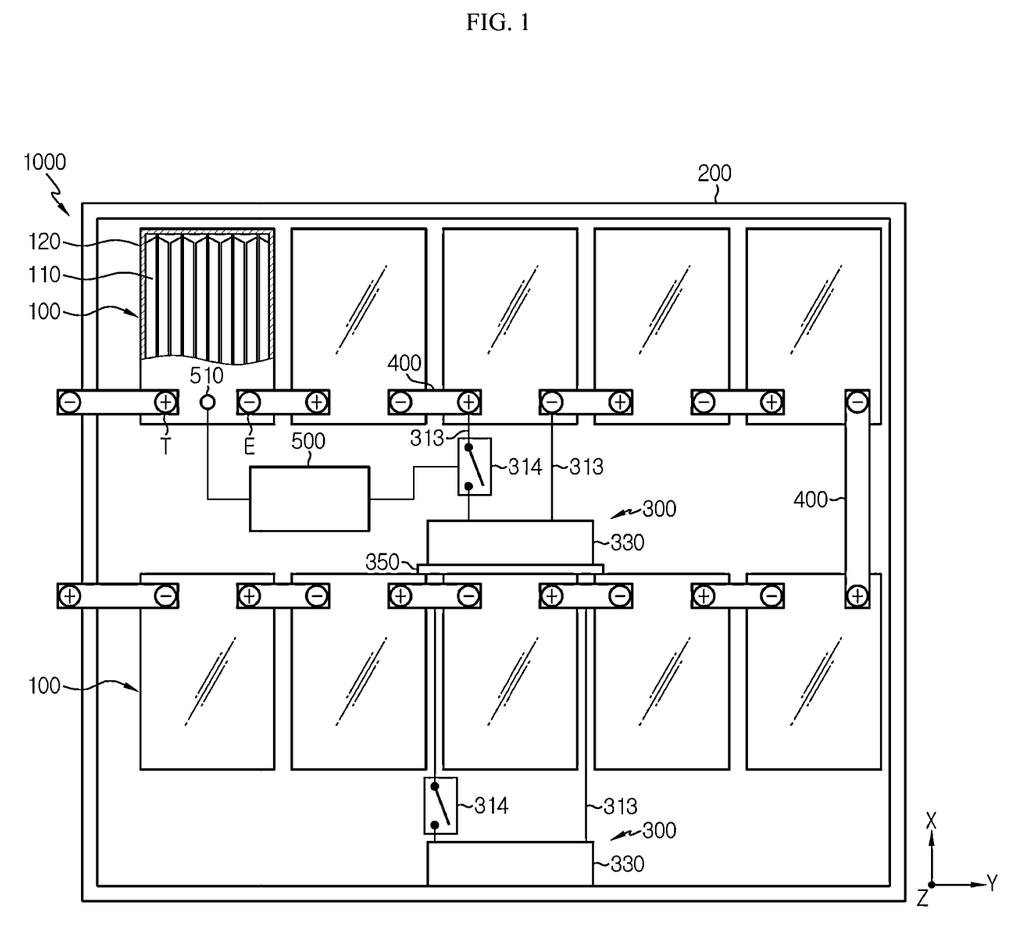
FIG. 1 is a plan view illustrating the inside of a battery pack according to Embodiment 1 of the present disclosure.
Figure 2:
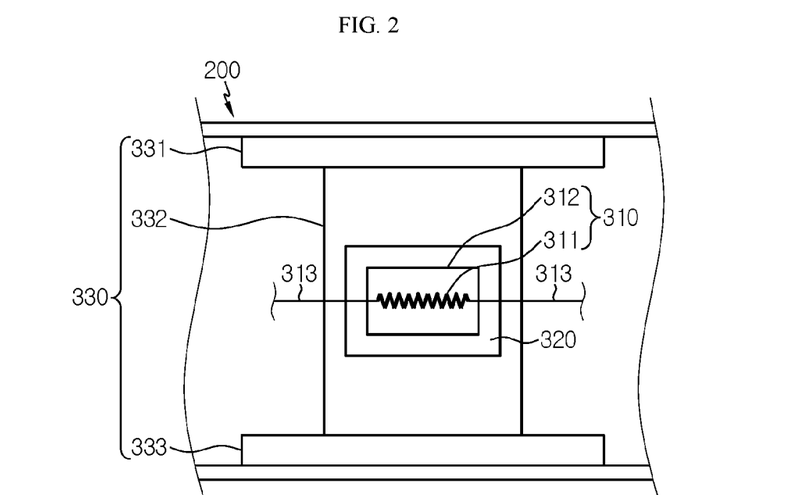
FIG. 2 is a partial side view illustrating a part of an energy consumption unit of the battery pack according to Embodiment 1 of the present disclosure.

FIG. 1 is a plan view illustrating the inside of a battery pack according to Embodiment 1 of the present disclosure. FIG. 2 is a partial side view illustrating a part of an energy consumption unit of the battery pack according to Embodiment 1 of the present disclosure. For convenience of explanation, a ceiling of a pack housing is not shown so that the inside of the battery pack is exposed to the outside in FIG. 1.

Referring to FIGS. 1 and 2, a battery pack 1000 according to Embodiment 1 of the present disclosure includes a plurality of battery modules 100 electrically connected to one another, a pack housing 200, and an energy consumption unit 300.

First, the pack housing 200 may be configured to accommodate the plurality of battery modules 100 thereinside. For example, the pack housing 200 may have a sealed quadrangular box shape. That is, the pack housing 200 may have an inner space in which the plurality of battery modules 100 may be accommodated. Also, the pack housing 200 may include an upper wall, a lower wall, and a side wall in a horizontal direction. In this case, the pack housing 200 may include an electrically insulating material, or a metal having an electrically insulating coating on a surface.

Furthermore, the plurality of battery modules 100 may include a plurality of battery cells 110, and a module case 120. For example, the battery cell 110 may be a pouch-type battery cell. The pouch-type battery cell is a battery cell in which an electrode assembly is accommodated in a well-known general pouch case. The plurality of battery cells 110 may be stacked in one direction, and may be accommodated in the module case 120. The battery module 100 may include an external positive electrode terminal T and an external negative electrode terminal E electrically connected to the plurality of battery cells 110.

The battery pack 1000 may further include a bus bar 400 configured to electrically connect the plurality of battery modules 100. One end of the bus bar 400 may be connected to the external positive electrode terminal T or the external negative electrode terminal E of one battery module 100, and the other end of the bus bar 400 may be connected to the external positive electrode terminal T or the external negative electrode terminal E of another battery module 100. The bus bar 400 may include an electrically conductive metal. The metal may be a metal such as aluminum, copper, or nickel, or an alloy including at least one of the metals.

Furthermore, the energy consumption unit 300 may be configured to, when thermal runaway occurs in at least one of the plurality of battery modules 100, discharge the specific battery module 100 and convert electrical energy stored in the battery module 100 into thermal energy. Also, the energy consumption unit 300 dissipates the thermal energy through the pack housing 200. To this end, the energy consumption unit 300 is connected between the pack housing 200 and at least one of the plurality of battery modules 100. For example, the energy consumption unit 300 may be configured to, when it is detected that thermal runaway occurs inside the battery pack 1000, generate external short circuit in the battery module 100, and convert electrical energy of the battery module 100 into resistive thermal energy so that a state of charge (SOC) of the battery module 100 becomes 20% or less within about 5 minutes. The energy consumption unit 300 may be connected to each battery module 100, or may be connected to only one or some battery modules 100 in consideration of energy density and/or the amount of thermal energy converted due to the operation of the energy consumption unit 300.

In detail, the energy consumption unit 300 may include a resistor unit 310, a heat insulating member 320, and a heat dissipating unit 330. The energy consumption unit 300 may be accommodated inside the pack housing 200. The resistor unit 310 may include a resistor 311 electrically connected to the external positive electrode terminal T and the external negative electrode terminal E of the battery module 100 and having a specific resistance equal to or greater than a certain level to convert electrical energy into thermal energy, and a resistor case 312 in which the resistor 311 is accommodated. The resistor unit 310 may include only the resistor 311, and may not include the resistor case 312.

Also, the heat insulating member 320 may be located to surround at least a part of the resistor unit 310. For example, the heat insulating member 320 may surround an upper portion, a lower portion, and a side portion of the resistor case 312 of the resistor unit 310. The heat insulating member 320 may include a material having very low thermal conductivity. For example, the heat insulating member 320 may include silica sand, feldspar, and limestone. The heat insulating member 320 may be manufactured by melting, for example, silica sand, feldspar, and limestone at a temperature of 1500° C. to 1600° C., fiberizing them by using a centrifugation method, and curing them by adding a binder. The heat insulating member 320 lowers a great amount of heat generated in the resistor unit 310 to a level at which there is no structural damage to the heat dissipating unit 330 and transfers the heat. When the heat insulating member 320 includes, for example, an aluminum material, in consideration of the above function of the heat insulating member 320, the heat insulating member 320 may be configured to limit a heat transfer rate so that the heat dissipating unit 330 does not rise above about 500° C. due to heat conducted from the resistor unit 310.

The heat dissipating unit 330 may be configured to connect the heat insulating member 320 to the pack housing 200 to conduct thermal energy received from the resistor unit 310 to the pack housing 200. For example, the heat dissipating unit 330 may be located so that a portion of the heat dissipating unit 330 surrounds the heat insulating member 320. The heat dissipating unit 330 may be located so that a portion of the heat dissipating unit 330 contacts an inner surface of an upper portion and/or a lower portion of the pack housing 200. The heat dissipating unit 330 may include a material having high thermal conductivity. For example, the heat dissipating unit 330 may include a metal such as aluminum or copper.

The heat dissipating unit 330 may have a receiving space in which the resistor unit 310 and the heat insulating member 320 may be accommodated. The heat dissipating unit 330 may have a shape extending upward and/or downward with respect to the resistor unit 310. When the heat dissipating unit 330 extends both upward and downward with respect to the resistor unit 310 and contacts both inner surfaces of the upper portion and the lower portion of the pack housing 200, heat dissipation effect using the pack housing 200 may be maximized.

Further, the energy consumption unit 300 may include electric wires 313 each having one end connected to the external positive electrode terminal T and the external negative electrode terminal E of the battery module 100 and the other end connected to the resistor 311 of the resistor unit 310, and a switch 314 configured to turn on/off an electrical connection to at least one of the electric wires 313. That is, the switch 314 may be configured to allow or block electrical connection between the resistor 311 of the resistor unit 310 and the battery module 100.

Also, the switch 314 may operate in an active manner or a passive manner. For example, when the switch 314 operates in an active manner, the battery pack 1000 may include a controller 500 configured to determine whether thermal runaway occurs in at least some of the plurality of the battery modules 100. The controller 500 may include a temperature sensor 510 for sensing a temperature of the battery module 100. The controller 500 outputs a switching control signal with reference to the temperature sensed by the temperature sensor 510. When the temperature of the battery module 100 rises above a certain temperature (e.g., 200° C.), the controller 500 may transmit an on-signal to the switch 314, so that the switch 314 is turned on to pass electricity through the electric wires 313.

Also, the switch 314 may operate in a passive manner. For example, the switch 314 may include a temperature switch including a bimetal. The temperature switch may be configured to be turned on when the air temperature inside the pack housing 200 rises above a certain temperature.

The temperature sensor 510 may be an element included in the controller 500, or may be an element that is separately provided. That is, when the temperature sensor 510 is included in the controller 500, for example, the controller 500 may be understood as a member including both a sensing unit and a control signal output unit for outputting a control signal with reference to a measurement value sensed by the sensing unit. In contrast, when the temperature sensor 510 is an element separately provided from the controller 500, the temperature sensor 510 is not only functionally separated from the controller 500 but also physically separated from the controller 500.

For example, the temperature sensor 510 may be attached to each of the battery modules 100 in a one-to-one manner, or may be located at a position adjacent to each battery module 100 in a one-to-one manner. In this case, even when an abnormality occurs in only at least some battery modules 100 in the battery pack 100, the abnormality may be rapidly detected and rapidly coped with. In contrast, a smaller number of temperature sensors 510 than the battery modules 100 may be provided. Even in this case, when it is detected that a temperature inside the battery pack 1000 rises above a certain level, an abnormality may be detected and may be coped with.

As such, according to the present disclosure, because a structure capable of converting electrical energy into thermal energy when thermal runaway occurs in at least some of the plurality of battery modules 100 may be provided, when an abnormality occurs in some battery modules 100 in the battery pack 1000, thermal runaway may be effectively prevented from propagating between the plurality of battery modules 100. That is, because electrical energy (power) of the battery module 100 in which thermal runaway occurs may be consumed as thermal energy, and thus the battery module 100 is prevented from causing thermal runaway any more, the thermal runaway may be prevented from propagating to other adjacent battery modules 100. Also, according to the battery pack 1000 according to the present disclosure, because electrical energy converted into thermal energy may be efficiently dissipated and/or discharged, heat may be prevented from being accumulated inside the battery pack 1000.

Figure 3:
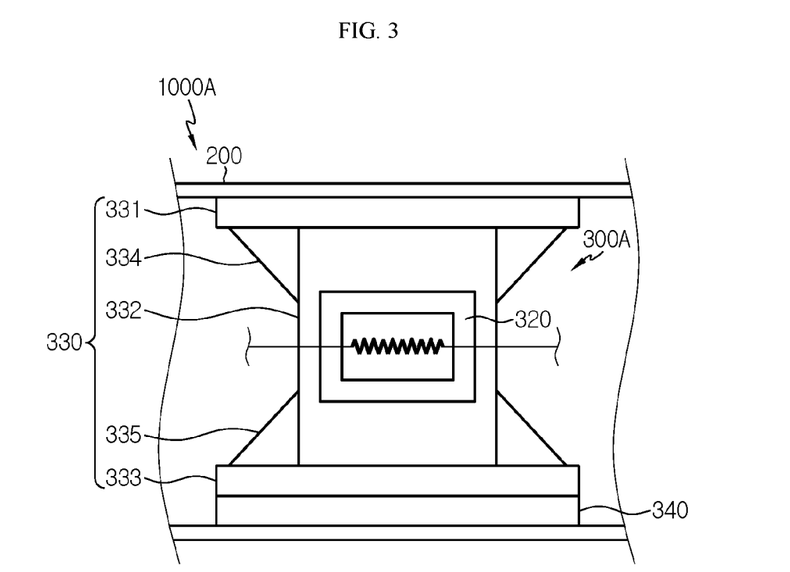
FIG. 3 is a partial side view illustrating a part of an energy consumption unit of a battery pack according to Embodiment 2 of the present disclosure.

FIG. 3 is a partial side view illustrating a part of an energy consumption unit of a battery pack according to Embodiment 2 of the present disclosure.

Referring to FIG. 3 together with FIG. 1, a battery pack 1000A according to Embodiment 2 of the present disclosure may further include a heat sink 340 and/or a first extending plate 334 and/or a second extending plate 335. Also, elements of the heat dissipating unit 330 of the battery pack 1000A according to Embodiment 2 may be different from elements of the heat dissipating unit 330 of the battery pack 1000 of Embodiment 1 of FIG. 2. However, other elements of the battery pack 1000A according to Embodiment 2 may be substantially the same as those of the battery pack 1000 of Embodiment 1.

In detail, the heat sink 340 may include an inlet (not shown) through which a cooling fluid is injected, a cooling fluid passage (not shown) through which the injected cooling fluid moves, and an outlet (not shown) through which the cooling fluid having moved along the cooling fluid passage is discharged to the outside. However, the heat sink 340 is not limited to the above elements, and various known cooling members may be applied to the heat sink 340.

Also, the heat sink 340 may be configured to receive heat from the heat dissipating unit 330 and transfer the heat to the pack housing 200. To this end, the heat sink 340 may be accommodated inside the pack housing 200 to contact a lower wall of the pack housing 200. In contrast, the heat sink 340 may be located outside the pack housing 200. In this case, the heat sink 340 may contact a bottom surface and/or a top surface of the pack housing 200.

Referring to FIG. 3, like in the battery pack 1000 according to Embodiment 1, in the battery pack 1000A according to Embodiment 2, the heat dissipating unit 330 may include an upper plate 331, a pillar portion 332, and a lower plate 333. In detail, the upper plate 331 may have a plate shape extending in a horizontal direction. A top surface of the upper plate 331 may contact an inner ceiling of the pack housing 200 or the heat sink 340. A bottom surface of the upper plate 331 may be connected to an upper portion of the pillar portion 332.

Furthermore, the pillar portion 332 may have a pillar shape extending in a vertical direction. An upper end of the pillar portion 332 may be coupled to a lower portion of the upper plate 331. The pillar portion 332 may have a receiving space in which the resistor unit 310 and the heat insulating member 320 are accommodated. That is, the pillar portion 332 may surround the resistor unit 310 and the heat insulating member 320.

Also, the lower plate 333 may have a plate shape extending in the horizontal direction. A portion of the lower plate 333 may be coupled to a lower end of the pillar portion 332. The lower plate 333 may contact a bottom surface of the pack housing 200 or the heat sink 340.

For example, as shown in FIG. 3, the heat dissipating unit 330 of the battery pack 1000A according to Embodiment 2 of the present disclosure may include the upper plate 331 contacting the inner ceiling of the pack housing 200 or the heat sink 340, the pillar portion 332 coupled to the upper plate 331 and having the receiving space in which the heat insulating member 320 and the resistor unit 310 are accommodated, and the lower plate 333 coupled to the pillar portion 332 and having a bottom surface contacting the bottom surface of the pack housing 200 or the heat sink 340.

Accordingly, according to this configuration of the present disclosure, because the heat dissipating unit 330 contacts the heat sink 340 in at least one of a direction toward the inner ceiling of the pack housing 200 and a direction toward the bottom surface of the pack housing 200, resistive heat generated in the resistor unit 310 may be effectively transferred to the pack housing 200 and/or the heat sink 340. Accordingly, the amount of resistive heat conducted to the battery module 100 in which thermal runaway does not occur may be reduced, thereby preventing propagation of thermal runaway.

Referring to FIG. 3 together with FIG. 1, the heat dissipating unit 330 of the energy consumption unit 300A of the battery pack 1000A according to Embodiment 2 of the present disclosure may further include the first extending plate 334 and/or the second extending plate 335, when compared to the heat dissipating unit 330 of the battery pack 1000 according to Embodiment 1 of FIG. 2. In detail, the first extending plate 334 may be configured to increase the transfer efficiency and the amount of heat transferred from the pillar portion 332 to the upper plate 331. Accordingly, the first extending plate 334 may be provided to connect an upper end of an outer surface of the pillar portion 332 to a bottom surface of the upper plate 331. That is, the first extending plate 334 may be configured to increase a heat transfer area between the pillar portion 332 and the upper plate 331.

Also, the second extending plate 335 may be provided to connect a lower end of the outer surface of the pillar portion 332 to a top surface of the lower plate 333. That is, the second extending plate 335 may be configured to increase a heat transfer area between the pillar portion 332 and the lower plate 333.

As such, according to the present disclosure, because the first extending plate 334 and/or the second extending plate 335 is further included, the amount of heat transferred from the heat dissipating unit 330 to the pack housing 200 and/or the heat sink 340 may be increased. Accordingly, resistive heat generated in the resistor unit 310 may be effectively dissipated and/or discharged.

Referring to FIG. 3 together with FIG. 1, in the heat dissipating unit 330 of the battery pack 1000A according to Embodiment 2 of the present disclosure, any one of the upper plate 331 and the lower plate 333 may contact the heat sink 340, and the other one may contact the inner ceiling or the bottom surface of the pack housing 200. In this case, the plate contacting the heat sink 340 may be formed to have a larger area than the other plate. For example, as shown in FIG. 3, the heat dissipating unit 330 may be provided so that the upper plate 331 contacts the inner ceiling of the pack housing 200 and the lower plate 333 contacts the top surface of the heat sink 340. In this case, the heat dissipating unit 330 may be configured so that the amount of resistive heat generated in the resistor unit 310 and transferred to the lower plate 333 is greater than that transferred to the upper plate 331. To this end, a size of the lower plate 333 extending in the horizontal direction may be greater than a size of the upper plate 331 extending in the horizontal direction.

As such, according to the present disclosure, because the area of the lower plate 333 contacting the heat sink 340 is greater than the area of the upper plate 331, resistive heat of the resistor unit 310 may be rapidly discharged to the outside. Accordingly, the safety of the battery pack 1000A may be more effectively improved.

Figure 4:
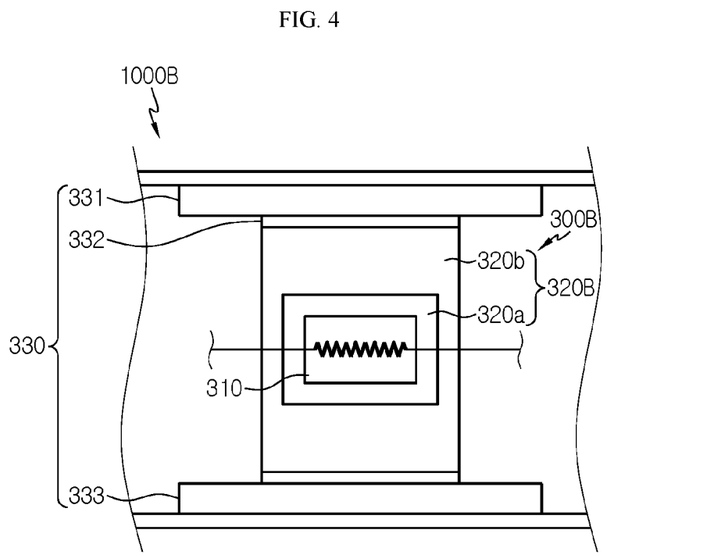
FIG. 4 is a partial side view illustrating a part of an energy consumption unit of a battery pack according to Embodiment 3 of the present disclosure.

FIG. 4 is a partial side view illustrating a part of an energy consumption unit of a battery pack according to Embodiment 3 of the present disclosure.

Referring to FIG. 4 together with FIG. 1, a battery pack 1000B according to Embodiment 3 of the present disclosure may be different from the battery pack 1000 according to Embodiment 1, in elements of the heat insulating member 320. Other elements are substantially the same as those of Embodiment 1.

In detail, a heat insulating member 320B of an energy consumption unit 300B of the battery pack 1000B according to Embodiment 3 of the present disclosure may be located to further surround the pillar portion 332 of the heat dissipating unit 330 in addition to at least a part of the resistor unit 310. For example, as shown in FIG. 4, the heat insulating member 320B may include a portion 320a surrounding the resistor unit 310 and a portion 320b extending to surround an outer surface of the pillar portion 332 in a horizontal direction. That is, the heat insulating member 320B may minimize the effect of heat radiated from the outer surface of the pillar portion 332 on the battery module 100 adjacent to the heat insulating member 320B.

As such, because the heat insulating member 320B is provided to further surround the pillar portion 332 of the heat dissipating unit 330, the transfer of resistive heat generated from the resistor unit 310 to another adjacent battery module 100 through the pillar portion 332 may be minimized. Accordingly, the safety of the battery pack 1000B may be more effectively improved.

Referring back to FIG. 1, the battery pack 1000 according to Embodiment 1 of the present disclosure may further include a heat insulating wall 350. The heat insulating wall 350 may be located to face at least a side of the energy consumption unit 300. For example, as shown in FIG. 1, the heat insulating wall 350 may be located between the heat dissipating unit 330 of the energy consumption unit 300 and the other battery module 100. That is, the heat insulating wall 350 may be configured to block resistive heat generated in the resistor unit 310 from being transferred to the other battery module 100. The heat insulating wall 350 may include, for example, a material having heat resistance and heat insulating properties. Examples of the material having heat resistance and heat insulating properties may include silica sand, feldspar, and limestone.

Accordingly, according to this configuration of the present disclosure, because the heat insulating wall 350 located on at least a side of the energy consumption unit 300 is further included, resistive heat generated in the resistor unit 310 may be prevented from increasing a temperature of the other battery module 100. Accordingly, the safety of the battery pack 1000 may be effectively improved.

Figure 5:
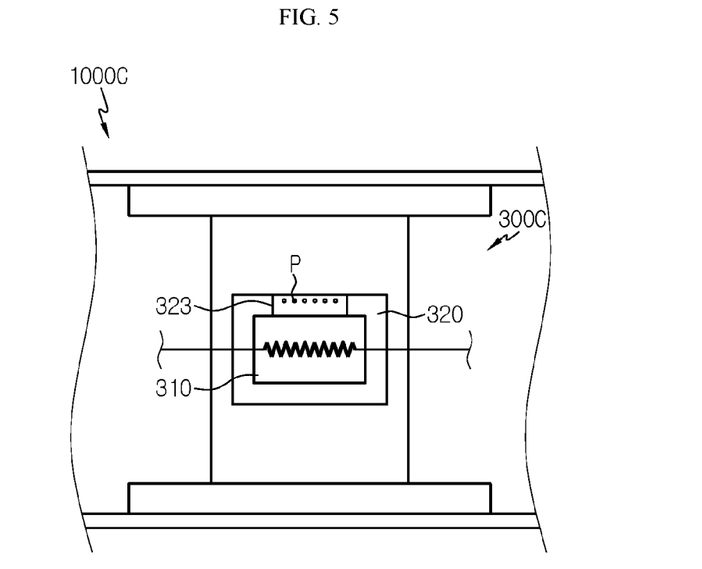
FIG. 5 is a partial side view illustrating a part of an energy consumption unit of a battery pack according to Embodiment 4 of the present disclosure.
Figure 6:
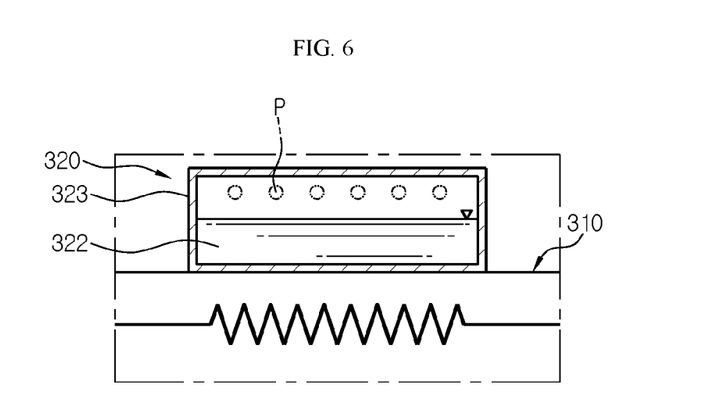
FIG. 6 is a partial cross-sectional view illustrating a part of the energy consumption unit of the battery pack according to Embodiment 4 of the present disclosure.

FIG. 5 is a partial side view illustrating a part of an energy consumption unit of a battery pack according to Embodiment 4 of the present disclosure. FIG. 6 is a partial cross-sectional view illustrating a part of the energy consumption unit of the battery pack according to Embodiment 4 of the present disclosure.

Referring to FIGS. 5 and 6, a battery pack 1000C according to Embodiment 4 of the present disclosure may be different from the battery pack 1000 of Embodiment 1 of FIG. 1, in elements of the heat insulating member 320. However, other elements are substantially the same as those of the battery pack 1000 of Embodiment 1.

In detail, the heat insulating member 320 of an energy consumption unit 300C of the battery pack 1000C according to Embodiment 4 of the present disclosure may include a receiving portion 323 in which a phase change material 322 is accommodated. The phase change material 322 whose phase varies according to a temperature may be, for example, water. The phase change material 322 may be configured to, when the resistor unit 310 converts electrical energy of the battery module 100 into thermal energy, be vaporized by receiving the thermal energy from the resistor unit 310.

Also, the heat insulating member 320 may include the receiving portion 323 in which the phase change material 322 is accommodated. The receiving portion 323 may be an empty space of the heat insulating member 320. Furthermore, an outlet P configured to discharge the vaporized phase change material 322 to the outside may be provided in the receiving portion 323. For example, the outlet P may be provided to allow the vaporized phase change material 322 to move between the plurality of battery modules 100. The outlet P may have, for example, a funnel shape protruding outward.

For example, as shown in FIG. 6, the heat insulating member 320 may include the receiving portion 323 and the phase change material 322 accommodated in the receiving portion 323. The phase change material 322 may be configured to be vaporized by receiving resistive heat of the resistor unit 310. For example, when the phase change material 322 is water, the phase change material 322 may be vaporized by resistive heat generated when the resistor unit 310 converts electrical energy of the battery module 100 into thermal energy. Vapor may be discharged between the plurality of battery modules 100 through the outlet P.

As such, according to the present disclosure, because the heat insulating member 320 includes the phase change material 322 and the receiving portion 323 in which the phase change material 322 is accommodated, the phase change material 322 may be vaporized by thermal energy received from the resistor unit 310, and the amount of thermal energy transferred from the resistor unit 310 to the heat dissipating unit 330 may be effectively reduced. Furthermore, the vaporized phase change material 322 may be discharged between the plurality of battery modules 100, to block heat transfer between the plurality of battery modules 100. Accordingly, propagation of thermal runaway between the plurality of battery modules 100 may be effectively prevented.

Figure 7:
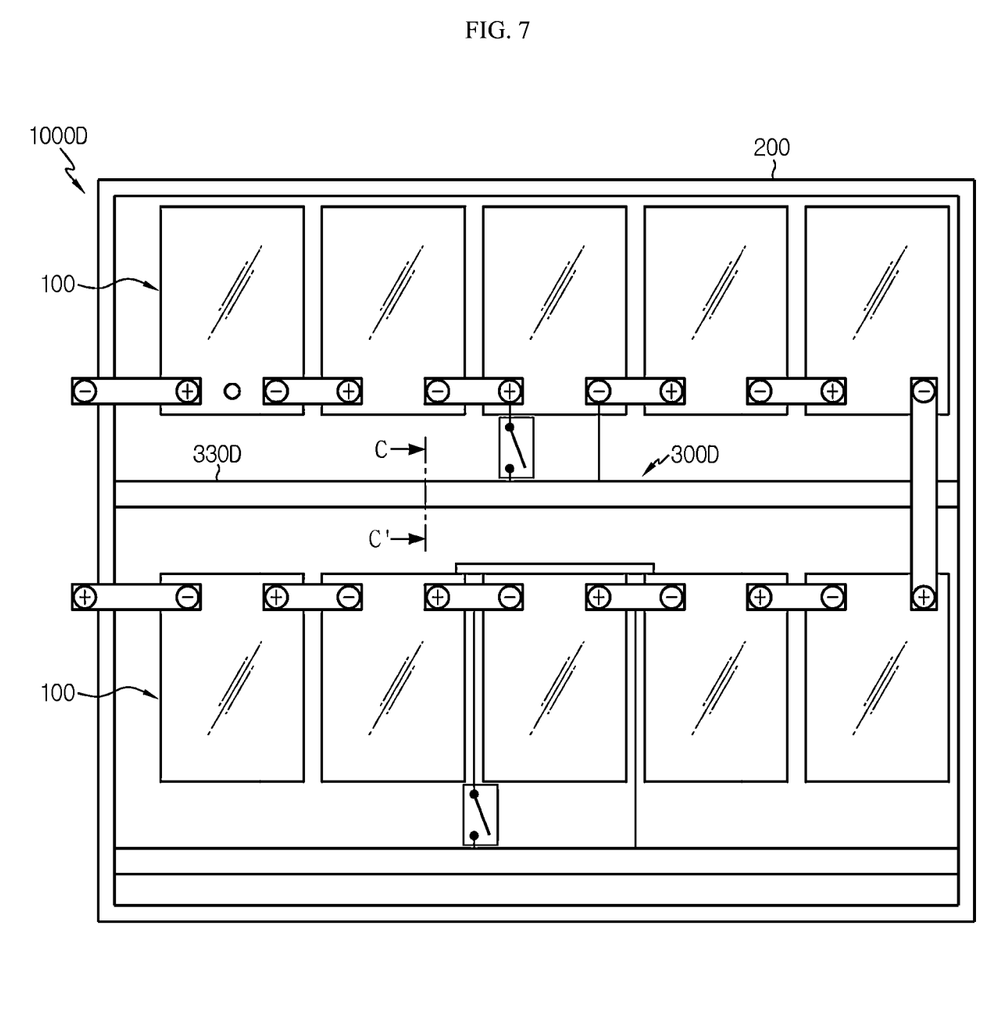
FIG. 7 is a plan view illustrating the inside of a battery pack according to Embodiment 5 of the present disclosure.
Figure 8:
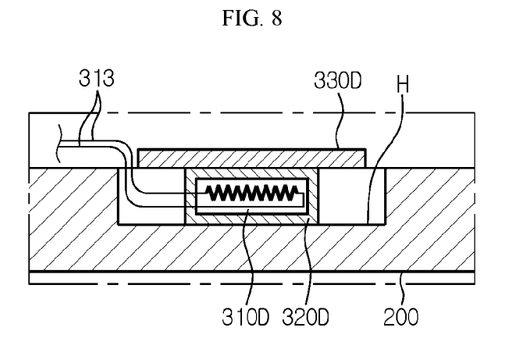
FIG. 8 is a partial cross-sectional view illustrating a part of the battery pack taken along line C-C' of FIG. 7.

FIG. 7 is a plan view illustrating the inside of a battery pack according to Embodiment 5 of the present disclosure. FIG. 8 is a partial cross-sectional view illustrating a part of the battery pack taken along line C-C' of FIG. 7.

Referring to FIGS. 7 and 8, a battery pack 1000D according to Embodiment 5 of the present disclosure may further include a receiving groove H in the pack housing 200, unlike the battery pack 1000 according to Embodiment 1. Also, the battery pack 1000D according to Embodiment 5 of the present disclosure has a difference in elements of an energy consumption unit 300D. However, other elements of the battery pack 1000D of Embodiment 5 are the same as those of the battery pack 1000 according to Embodiment 1.

In detail, the pack housing 200 of the battery pack 1000D according to Embodiment 5 may further include the receiving groove H in which at least a part of a resistor unit 310D is accommodated. Also, a heat insulating member 320D may be located to surround the at least part of the resistor unit 310D accommodated in the receiving groove H. For example, as shown in FIG. 7, the resistor unit 310D may be accommodated in the receiving groove H that longitudinally extends in one direction. The resistor unit 310D may have a shape longitudinally extending in one direction. The heat insulating member 320D may be located to surround an outer surface of the resistor unit 310D accommodated in the receiving groove H. The heat insulating member 320D may also be accommodated in the receiving groove H. The heat insulating member 320D may be configured to prevent damage to the pack housing 200 due to resistive heat generated in the resistor unit 310D.

As such, according to the present disclosure, because the receiving groove H is provided in the pack housing 200 to accommodate at least a part of the resistor unit 310D and the heat insulating member 320D is located to surround the at least part of the resistor unit 310D accommodated in the receiving groove H, a length of a thermal conduction path through which heat generated in the resistor unit 310D is conducted to the pack housing 200 may be minimized. Accordingly, the battery pack 1000D according to the present disclosure may effectively discharge heat to the outside of the battery pack 1000D, and may minimize a temperature increase of the other battery module 100 due to resistive heat.

Referring back to FIGS. 7 and 8, a heat dissipating unit 330D of the battery pack 1000D according to Embodiment 5 of the present disclosure may have a plate shape extending in a horizontal direction on the heat insulating member 320D. The heat dissipating unit 330D may be provided so that an end portion of the heat dissipating unit 330D in the horizontal direction is connected to an inner surface of the pack housing 200. Both end portions of the heat dissipating unit 330D may extend to a side wall of the pack housing 200. For example, as shown in FIG. 7, the heat dissipating unit 330D may have a shape in which both end portions longitudinally extend in the pack housing 200 to contact the inner surface of the pack housing 200. The heat dissipating unit 330D may be located to surround a top surface of the heat insulating member 320D.

As such, according to the present disclosure, the heat dissipating unit 330D has a plate shape extending in the horizontal direction on the heat insulating member 320D, and an end portion of the heat dissipating unit 330D in the horizontal direction contacts the inner surface of the pack housing 200. That is, because both end portions of the heat dissipating unit 330D extend to contact the side wall of the pack housing 200, heat generated in the resistor unit 310D may be effectively conducted to the pack housing 200. Accordingly, according to the present disclosure, heat may be effectively discharged to the outside of the battery pack 1000D, and a temperature increase of the other battery module 100 due to resistive heat may be minimized.

Any of the battery packs 1000 through 1000D of the present disclosure may further include various devices (not shown) for controlling charging/discharging of the plurality of battery modules 100, for example, a BMS, a current sensor, and a fuse.

Figure 9:
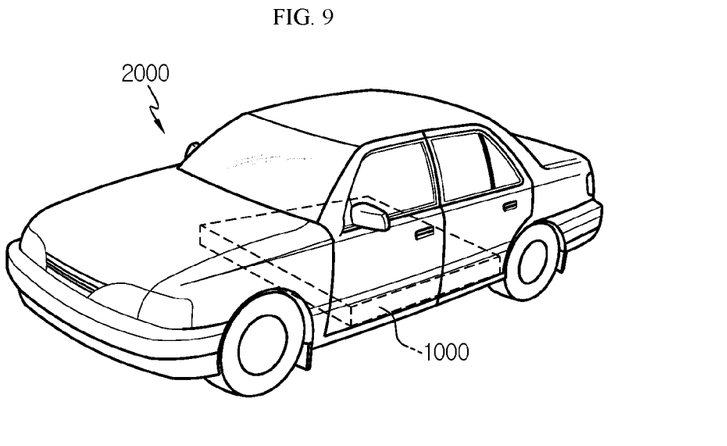
FIG. 9 is a perspective view illustrating an appearance of a vehicle according to an embodiment of the present disclosure.

FIG. 9 is a perspective view illustrating an appearance of a vehicle according to an embodiment of the present disclosure.

Referring to FIG. 9, any of the battery packs 1000 through 1000D of the present disclosure may be included in a vehicle 2000 such as an electric vehicle or a hybrid vehicle. That is, the vehicle according to an embodiment of the present disclosure may mount any of the battery packs 1000 through 1000D of the present disclosure in a vehicle body.

It will be understood by one of ordinary skill in the art that when terms indicating directions such as upper, lower, left, right, front, and rear are used, these terms are only for convenience of explanation and may vary according to a position of a target object, a position of an observer, etc.

The present disclosure has been described in detail. However, it should be understood that the detailed description and specific examples, while indicating preferred embodiments of the present disclosure, are given by way of illustration only, since various changes and modifications within the scope of the present disclosure will become apparent to those skilled in the art from this detailed description.

What is claimed is:

1. A battery pack comprising:
   a plurality of battery modules;
   a pack housing in which the plurality of battery modules are accommodated; and
   an energy consumer accommodated inside the pack housing, connected to at least one battery module of the plurality of battery modules, and configured to convert energy stored in the at least one battery module into thermal energy; and
   a temperature activated switch configured to connect the at least one battery module and the energy consumer as a temperature inside the pack housing increases,
   wherein the energy consumer is configured to dissipate the thermal energy through at least one of the pack housing and a heat sink.

2. The battery pack of claim 1, wherein the energy consumer comprises:
   a resistor electrically connected to the at least one battery module as the temperature inside the pack housing increases;
   a heat insulating member surrounding at least a part of the resistor; and
   a heat dissipater configured to connect the heat insulating member to the pack housing.

3. The battery pack of claim 2, wherein the heat dissipater comprises:
   an upper plate extending in a horizontal direction, and comprising an upper surface contacting an inner ceiling of the pack housing or the heat sink;
   a pillar extending in a vertical direction, and comprising an upper end coupled to a lower surface of the upper plate and a receiving space in which the resistor and the heat insulating member are accommodated; and
   a lower plate extending in the horizontal direction, and comprising an upper surface coupled to a lower end of the pillar and a lower surface contacting a bottom surface of the pack housing or the heat sink.

4. The battery pack of claim 3, wherein the heat dissipater further comprises:
   a first extending plate configured to connect an upper end of an outer surface of the pillar to the lower surface of the upper plate; and
   a second extending plate configured to connect a lower end of the outer surface of the pillar to the upper surface of the lower plate.

5. The battery pack of claim 3, wherein any one of the upper plate and the lower plate contacts the heat sink, and the plate contacting the heat sink has a larger area than the other plate.

6. The battery pack of claim 3, wherein the heat insulating member further surrounds the pillar.

7. The battery pack of claim 2, further comprising at least one heat insulating wall located between the heat dissipater and a second battery module of the plurality of battery modules.

8. The battery pack of claim 2, wherein the heat insulating member comprises a phase change material and a receiving portion in which the phase change material is accommodated,
   wherein the phase change material is configured to, when the resistor converts energy of the at least one battery module into thermal energy, be vaporized by receiving the thermal energy from the resistor, and wherein an outlet configured to discharge the vaporized phase change material to outside is provided in the receiving portion.

9. The battery pack of claim 2, wherein the pack housing comprises a receiving groove in which at least a part of the resistor is accommodated, and
wherein the heat insulating member surrounds the at least part of the resistor accommodated in the receiving groove.

10. The battery pack of claim 9, wherein the heat dissipater has a plate shape extending in a horizontal direction on the heat insulating member, and comprises end portions extending to a side wall of the pack housing to be connected to an inner surface of the pack housing.

11. A vehicle comprising the battery pack according to claim 1.

12. The battery pack of claim 1, wherein the temperature activated switch is a bimetal switch.

13. The battery pack of claim 1, further comprising a temperature sensor connected to the temperature activated switch.

* * * * *